W. H. NIEMEYER.
BOTTLE CAPPING MACHINE.
APPLICATION FILED MAY 29, 1907.
991,879.
Patented May 9, 1911.
6 SHEETS—SHEET 3.
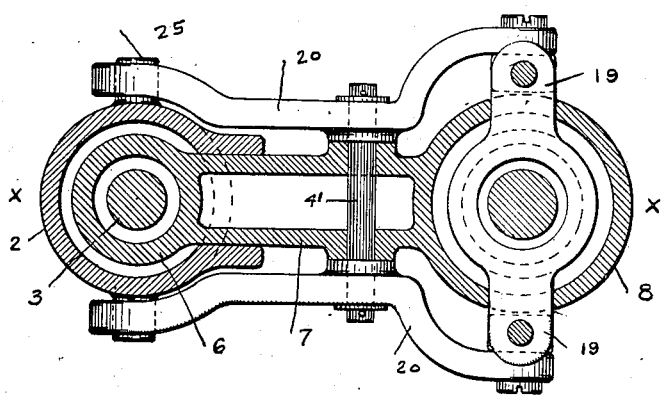
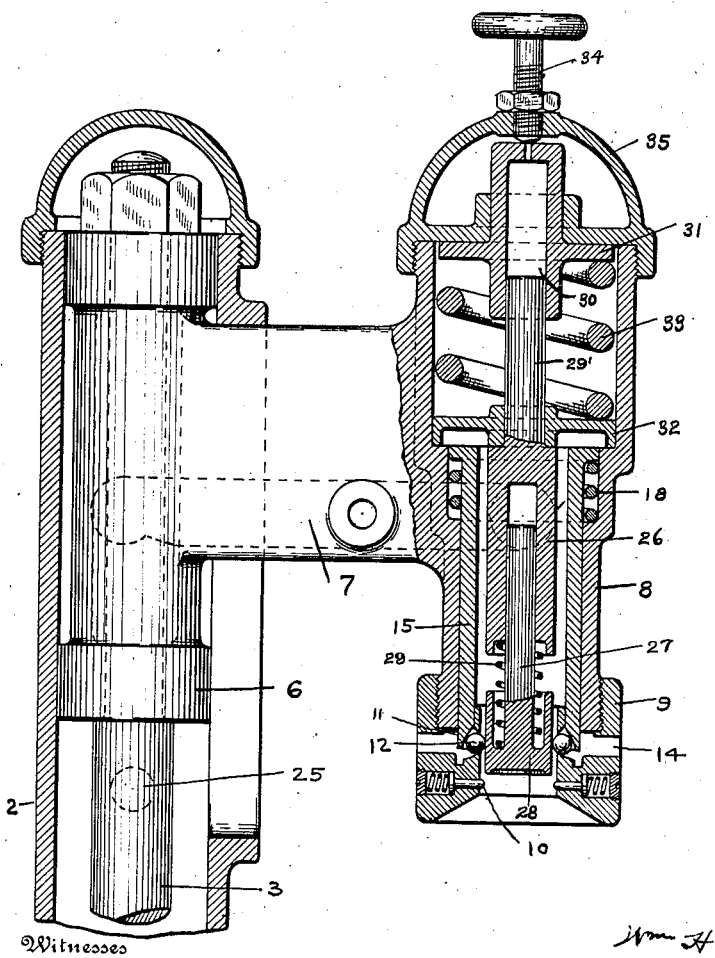

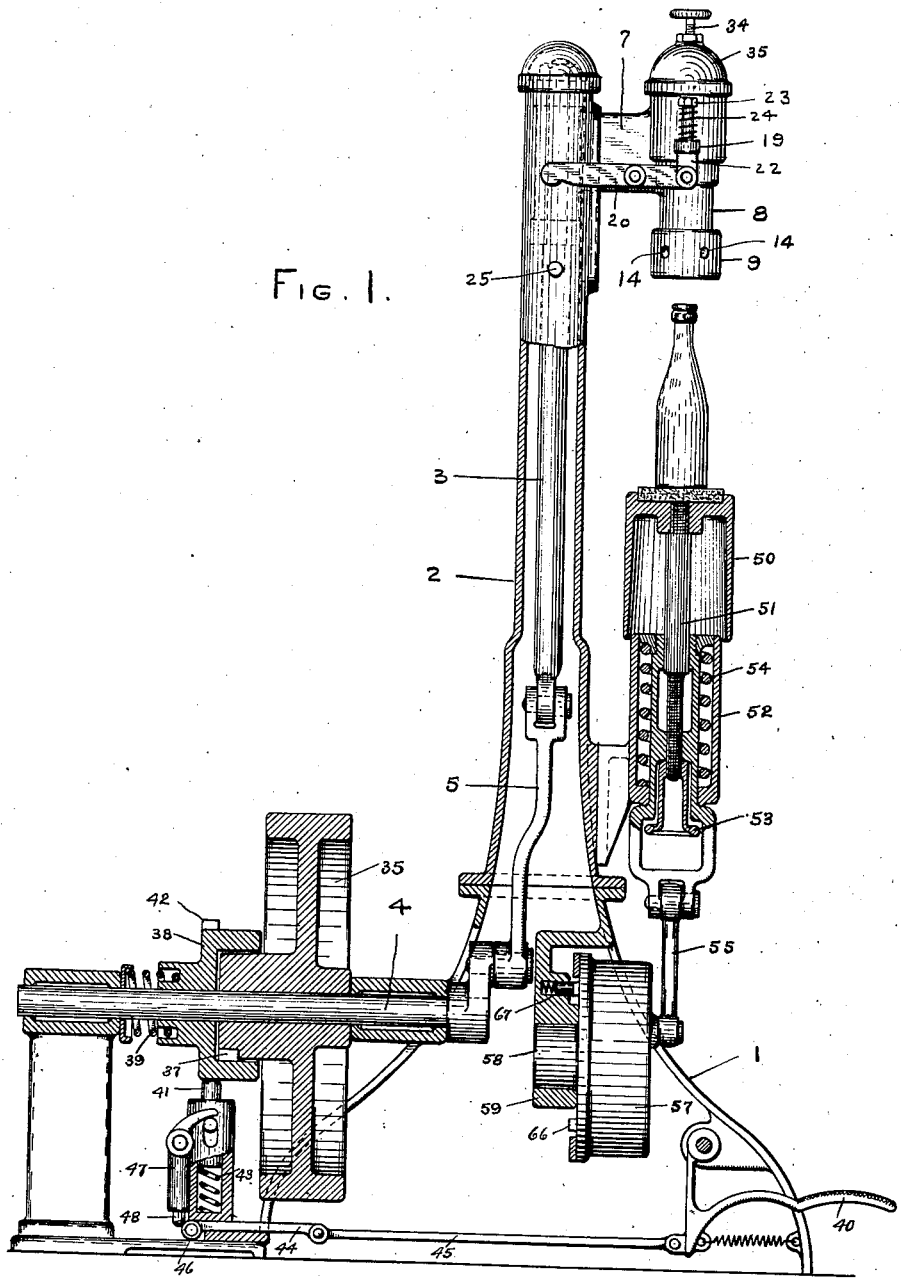

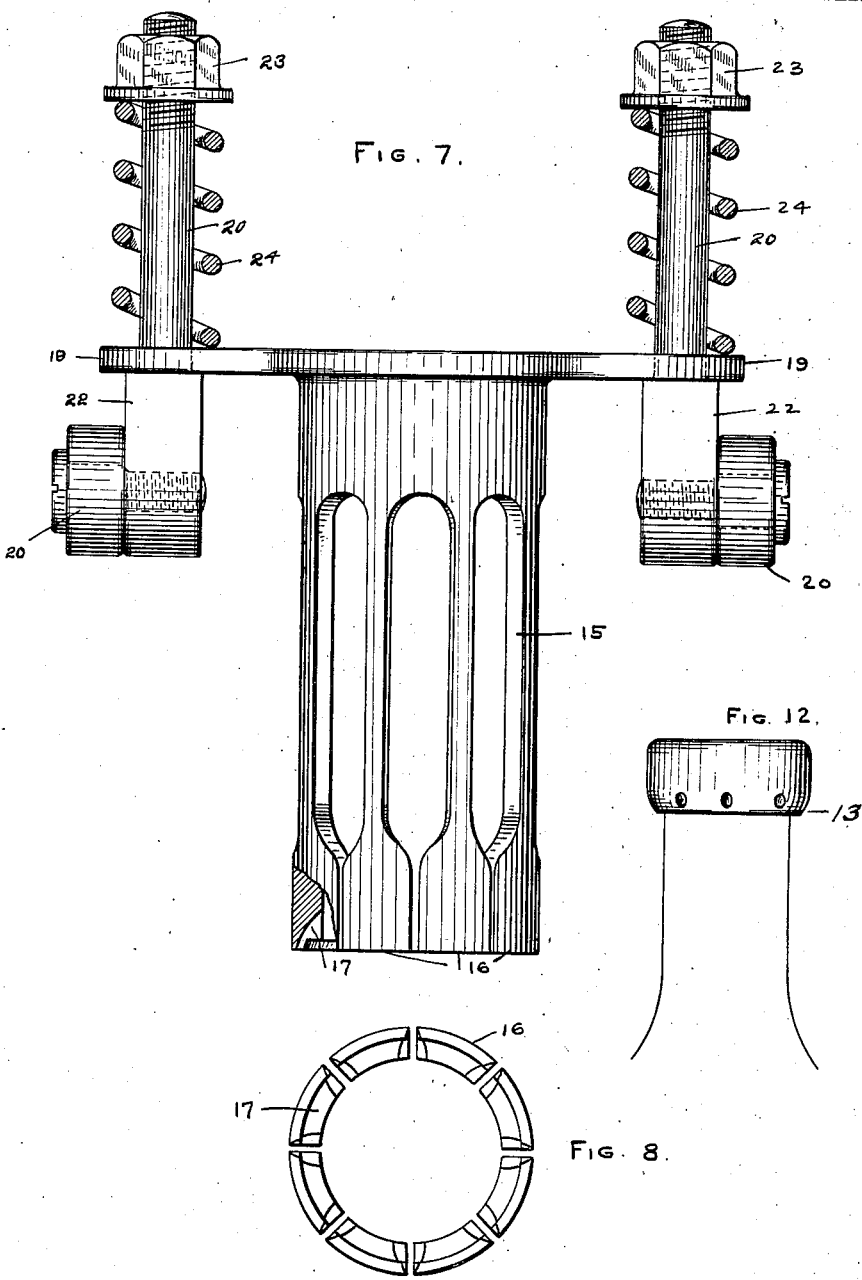

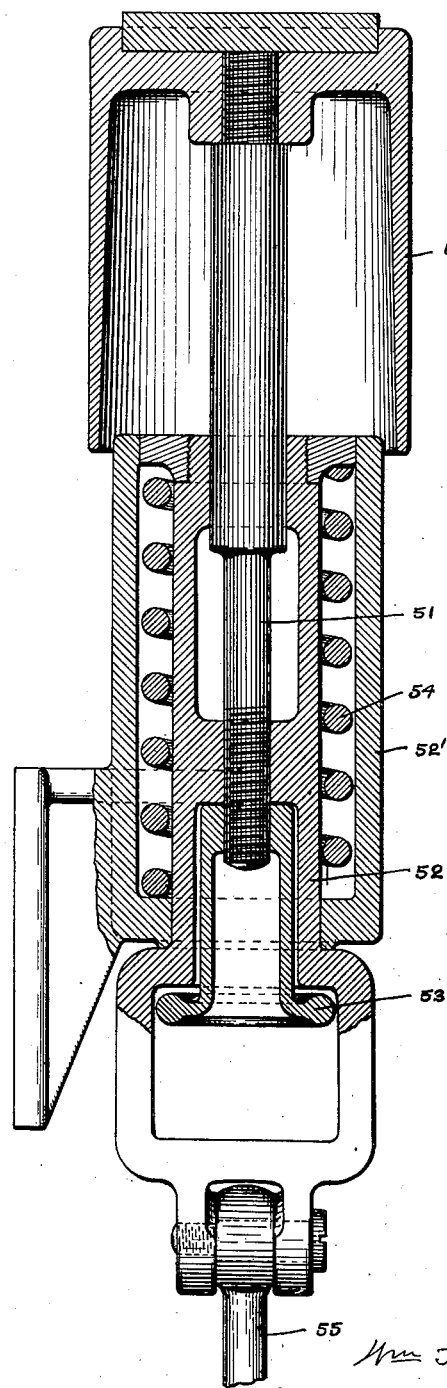

W. H. NIEMEYER.
BOTTLE CAPPING MACHINE.
APPLICATION FILED MAY 29, 1907.

991,879.

Patented May 9, 1911.

6 SHEETS—SHEET 6.

UNITED STATES PATENT OFFICE.

WILLIAM H. NIEMEYER, OF BALTIMORE, MARYLAND.

BOTTLE-CAPPING MACHINE.

991,879.  Specification of Letters Patent.  Patented May 9, 1911.

Application filed May 29, 1907. Serial No. 376,327.

*To all whom it may concern:*

Be it known that I, WILLIAM H. NIEMEYER, a citizen of the United States, residing at Baltimore, in the State of Maryland, have invented certain new and useful Improvements in Bottle-Capping Machines, of which the following is a specification.

This invention relates to improvements in bottle-capping machines, and the object is to provide a machine which is simple in construction and by means of which the caps may be readily and securely applied to the bottles without breaking or damaging in any manner the heads of the bottles.

With the above object in view, the invention consists in the novel features of construction hereinafter fully described, particularly pointed out in the claims, and clearly illustrated by the accompanying drawing, in which—

Figure 4:
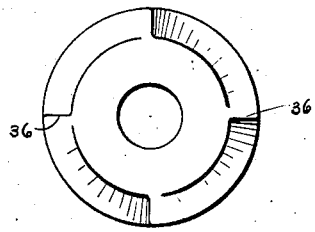
Figure 3:
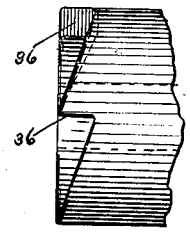
Figure 2:
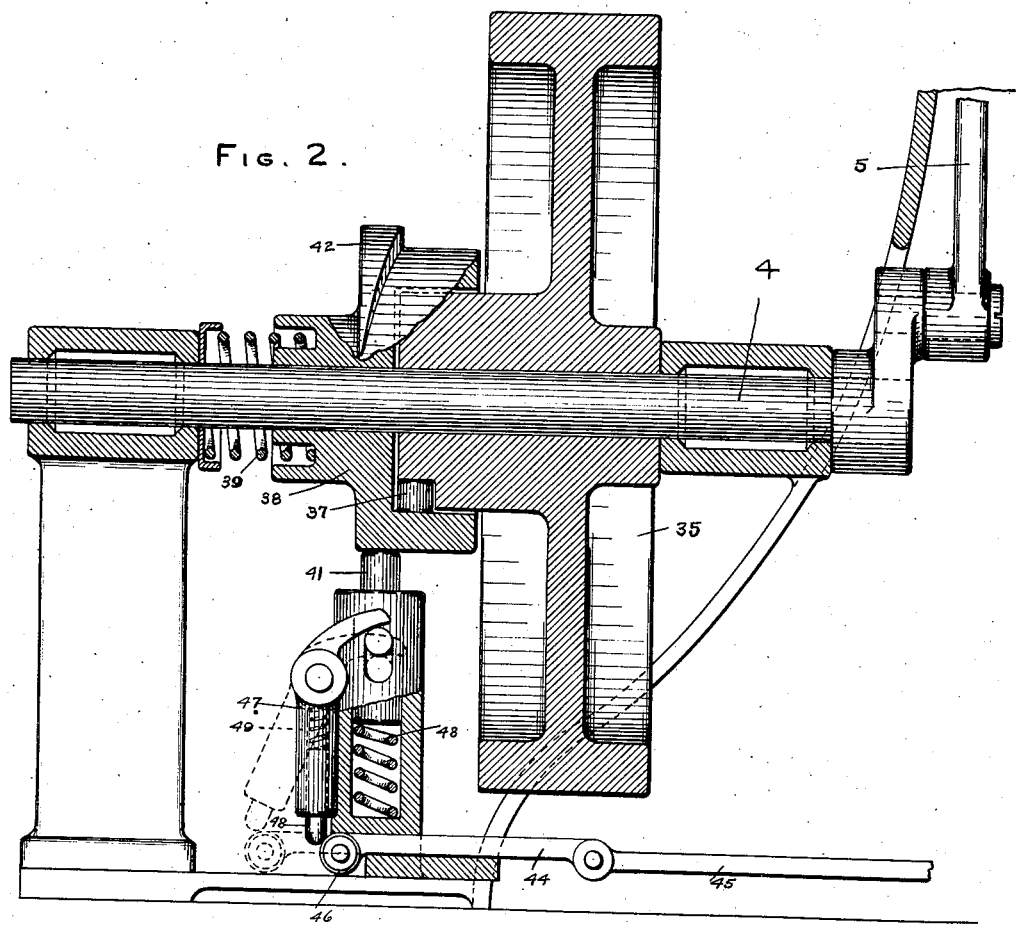
Figure 10:
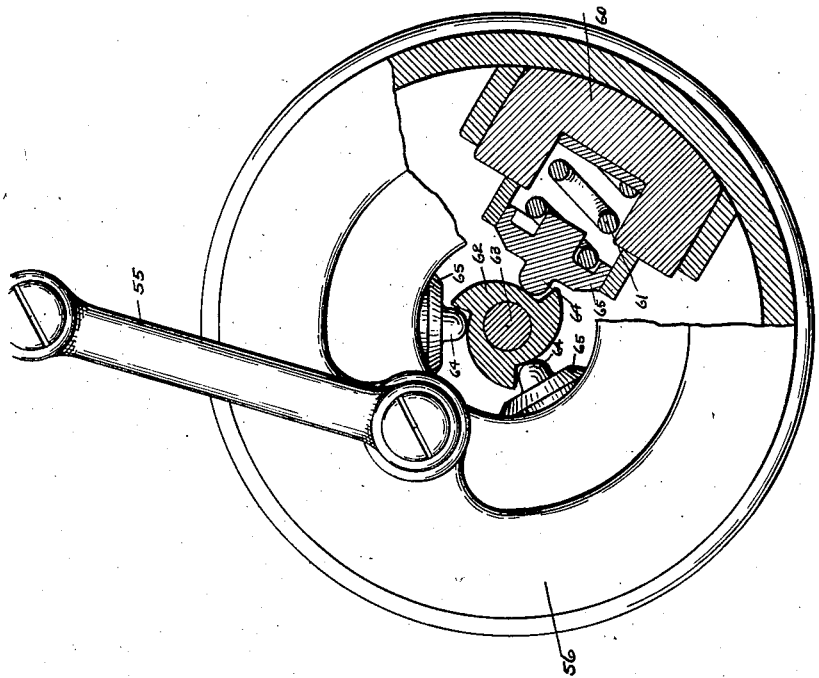
Figure 11:
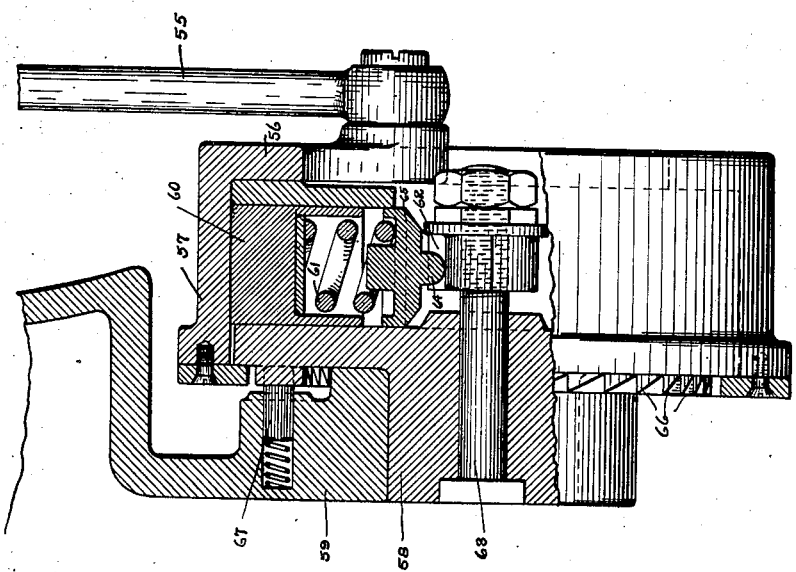

Figure 1 is a side elevation partly in section, of a bottle capping machine constructed in accordance with my invention. Fig. 2, an enlarged view, partly in section and partly in side elevation illustrating the mechanism for operatively connecting the driving-wheel to the operating-shaft and automatically releasing the same therefrom; Fig. 3, a detail view showing the toothed hub of the driving-wheel in side elevation; Fig. 4, a face view of said hub; Fig. 5, a vertical sectional view through the column of the machine, the plunger and the capping head; Fig. 6, a horizontal sectional view through the column of the machine, the plunger and the capping-head, taken on the line *x*—*x* of Fig. 6; Fig. 7, an enlarged view, showing the operating-member for the series of pressure-applying devices, and the operating levers therefor, together with the pressure-relieving mechanism; Fig. 8, an end-elevation of the operating-member looking at the operative end thereof; Fig. 9, an enlarged sectional view taken vertically through the bottle-supporting table or stand; Fig. 10, a face view partly in section, showing the compensating device for the bottle-table or stand; Fig. 11, a view of the same, partly in side elevation and partly in section, and Fig. 12, a view of the head of a bottle showing the cap applied in accordance with my invention.

Referring now more particularly to the drawings, 1 indicates the base of the machine having the vertical column 2, raised therefrom. Movable vertically in said column is a plunger 3, operatively connected at its lower end eccentrically to a driving-shaft 4, by a pitman 5. One end of the shaft is supported in the base of the machine and the other end in a standard raised therefrom. Secured upon the upper end of the plunger is a sleeve 6 having a laterally-extending arm 7 which projects through and works vertically in a slot formed in the wall of the column. The outer end of said arm 7 carries a vertically-disposed tubular-head 8, threaded upon the lower end of which is a collar or ring 9, having an inner conical face or mouth to receive the mouth of the bottle when the head is lowered. Spring-pressed pins 10 are provided in said ring 9 to hold the bottle-cap in position in the head.

The collar or ring 9 is formed with an internal annular groove or chamber 11 open at its top and having its inner wall provided at intervals with openings of sufficient size to permit the pressure-applying balls 12, to be forced partially therethrough by the operating-member presently to be described for the purpose of pressing the flange of the metal cap 13 in under the bead of the bottle at various points about its circumference as illustrated in Fig. 12. These balls are inserted through openings 14 formed in the outer wall of said ring or collar.

Movable vertically in the head is an operating-member 15 in the form of a sleeve or tube having its circumference divided into a plurality of yielding sections 16, one for each pressure applying ball 12, said sections being formed integral at their upper ends with the sleeve but separated at their lower ends from each other, as clearly illustrated in Figs. 7 and 8. The opposing edges of the sections 16 at their lower ends are beveled to form cam-operating portions 17 and also to form with the openings in the inner wall of the collar or ring 9, pockets for the balls, the operating-member normally extending into the annular groove or chamber 11 of said collar or ring, as shown in Fig. 5.

Arranged between a flange formed on the upper end of the operating-member and a shoulder on the interior of the head, is a spring 18 which serves to return the operating-member to its normal position after it has been moved to actuate the pressure-applying members 12. Said operating-member is provided with lugs 19 disposed laterally from opposite sides of the upper end thereof; said lugs projecting through and movable in vertical slots formed in the walls of the capping-head.

Pivotally mounted on the respective sides of arm 7, are levers 20, connected by a shaft 4' extending through the arm, as indicated in Fig. 6. At one end said levers are pivotally attached to the lower ends of vertically-disposed arms 22 which pass upward through perforations in the lugs 19 of the operating-member 15, the upper ends of said arms being threaded to receive nuts 23. These levers 20 are actuated to effect the movement of the operating-member 15 by contact with studs 25 projecting from opposite sides of the column 2, when the plunger is moved downwardly a sufficient distance. The springs 24 serve to receive the shock that would otherwise be caused by the sudden contact of the levers with the studs, so that the operating-member is not actuated violently, which would be liable to crack or break the bottle.

The cap is held in position on the bottle preparatory to the pressing in of its flange under the bottle-bead by a retaining-member consisting of a part 26 having a portion thereof projecting into the operating-member or sleeve 15 and formed with a longitudinally-extending opening to receive the stem of a part 27. Said part 27 is formed with a head 28 to press upon the top of the cap, and a spring 29 is interposed between said head and the lower end of part 26. Thus part 27 is yieldingly connected with part 26, as clearly shown in Fig. 5. Part 26 is formed at its upper end with a stem 29', the upper end of which is adapted to slide in socket 30 carried by a disk 31 adjustable in the enlarged upper end of the head 8. A disk 32 is placed upon the stem 29, said disk bearing against a shoulder formed on the part 26 at the lower end of the stem and against a shoulder formed in the head, and between the disks 31 and 32, a coiled spring 33 is interposed. The cap-retaining member comprising said parts 26 and 27 may move upwardly as a whole against the tension of spring 33 after part 27 has yielded to its limit against the pressure of its spring 29. The tension of spring 33 is varied by means of a screw 34 carried by the screw-cap 35 which closes the upper end of the head 8, said adjusting-screw 34 bearing against the upper end of the socket 30 of disk 31.

The operation of my invention as thus far described is as follows: A cap is inserted in the collar or ring 9, being held by the spring-pressed pins 10, and the plunger 3 is moved downwardly by the mechanism hereinafter to be described carrying with it the head 8 and the parts carried thereby. When the bottle is reached, the cap seats thereon and is held by the retaining-member consisting of parts 26 and 27. During the further movement of the head the part 27 of said member yields upwardly and then said member as a whole. Thus breakage of the bottle is prevented regardless of the suddenness of the contact of the head therewith. By the contact of the levers 20 with the studs 25 the movement of the sleeve or operating-member 15 within the head is effected to force the pressure-applying balls 12 outward to apply pressure at different points about the circumference of the flange of the cap to press the same in under the bead of the bottle. The operating-member or sleeve 15 is formed with the yielding portions so that the bottle will not be crushed in event the bead should not be a perfect circle. Each pressure-applying ball is operated by a yielding part so that unevenness of the bead at any point will be taken care of.

Loose on shaft 4 is a driving wheel 35, said wheel having a hub provided with clutch-teeth 36, as shown in Figs. 3 and 4, to be engaged by a projection 37 carried by a sliding clutch-member 38 also mounted on said shaft. A coiled spring 39 serves to normally press said clutch-member 38 forwardly with its projection 37 in engagement with one of the clutch-teeth of the hub of the driving wheel. The driving-wheel would thus be normally locked to the shaft 4 and the plunger would be reciprocated at each revolution thereof were it not for the provision of a mechanism for automatically releasing said driving-wheel and permitting the plunger to be moved to effect the operation of the capping mechanism only once on each depression of the treadle 40. This automatic releasing mechanism consists of a sliding projection 41 suitably mounted on the base of the machine and normally held in the path of a cam 42 on the revolving clutch member 38 by a spring 43. The engagement of this cam with the projection 41 will effect the movement of said clutch-member against the tension of its spring to disengage the projection 37 carried thereby from the teeth of the hub of the driving-wheel. The treadle 40 is pivotally attached to the base of the machine and is pivotally connected with a pusher-arm 44 by a rod 45. Said pusher-arm carries a roller 46 which when the treadle is depressed, engages and swings on its pivot, an intermediately pivoted lever 47, the upper hooked end of which engages a stud carried by the sliding projection 41. This sliding projection is thus moved out of the path of the cam carried by the clutch-member and the latter permitted to lock the driving-wheel to the shaft, whereby the plunger is moved to effect the actuation of the capping mechanism. The lower portion 48 of the lever 47 is slidable on said lever being held normally in its outer position by a spring 49. By this construction of lever, even though the treadle is held depressed, the driving-wheel will be released, as the sliding-portion 48 of said lever will move upwardly sufficiently to permit the lever to swing back to its normal position, thereby releasing the sliding projection 41 which again returns to its position in the path of the cam carried by the clutch-member.

The table or bottle-stand consists of an inverted cup-shaped body 50 having a stem 51 threaded through the central web portion of a supporting arm 52 and receiving a hand-nut 53. The table may thus be readily adjusted vertically on said supporting arm to work bottles of various heights. This supporting arm is movable vertically through a casing 52' attached to or formed as a part of the machine frame, against the tension of a coiled spring 54. The lower end of said supporting-arm is connected by a pitman 55 eccentrically with a rotary friction member 56 having a flange 57 rotatable on a co-acting friction member 58, mounted to rotate in a suitable support 59 attached to or formed as a part of the machine base, and carrying a plurality of shoes 60 pressed outwardly into engagement with the flange 57 by springs 61. The tension of the springs is varied by the rotary adjustment of a tension-device 62 mounted on a shaft 63 supported in the hub of friction-member 58, said device being formed with a number of cams, one for the projection 64 of each disk 65, said disks bearing against the springs 61.
The friction-member 58 has upon its rear face, a series of teeth 66 engaged by a spring-pressed pawl 67 carried by the support 59.

The operation of the compensating device, of that part of my invention just described, is as follows: When the capping mechanism contacts with the bottle, the table on which the latter is supported yields downwardly against the tension of spring 54. Through the medium of the pitman 55, the friction device 56 is rotated against the tension or pressure of the shoes 60, the friction member 58 being held from rotation by the pawls 67. Upon the return of the parts to their normal positions, the pawl slips over the teeth and the two friction members rotate as one. By this arrangement the points of bearing of the shoes against the flange of friction-member 56 are constantly shifted whereby the inner surface of said flange wears evenly.

By providing the compensating device described, the shock or jar incident to the engagement of the capping mechanism with the bottle is relieved, and breakage of the latter prevented.

Having thus fully described my invention, what I claim as new, and desire to secure by Letters Patent of the United States, is:—

1. In a bottle-capping machine, a capping-head having an opening to receive the cap, comprising yieldable means for holding said cap within said opening a plurality of pressure-applying members carried by said head and arranged to be projected through openings in the wall of said cap-receiving opening for the purpose of engaging and applying pressure at various points about the circumference of the cap-flange, an actuating-member carried by said head for effecting the movement of said pressure-applying members and means for actuating said member.

2. In a bottle-capping machine, a capping-head comprising means for reciprocating the same, a plurality of pressure-applying devices movable laterally therein for applying pressure at various points about the circumference of the cap-flange and having constantly changing bearing surfaces, an actuating member carried by the head having cam-surfaces co-acting with the cam-surfaces of the pressure-applying members for the purpose of effecting the movement of the latter, and means for actuating said member.

3. In a bottle-capping machine, a capping-head comprising a plurality of pressure-applying members for applying pressure at different points about the circumference of the cap-flange, said members formed with cam surfaces, an actuating member having a plurality of yielding sections, each section provided with a cam-surface engaging and co-acting with the cam-surface of one of the pressure-applying-members, and means for effecting the movement of the actuating member.

4. In a bottle-capping machine, a capping-head having a cap-receiving opening, comprising a yielding member carried by said head for engaging the top of the cap and holding it in position on the bottle, a plurality of pressure-applying members carried by said head for applying pressure at different points about the circumference of the cap-flange, said members being movable into the cap-receiving opening of the head, an actuating-member carried by the head having yielding operating-portions for engaging and effecting the movement of said pressure-applying devices, and means for effecting the movement of said actuating-member.

5. In a bottle-capping machine, a capping-head comprising a plurality of pressure-applying devices carried thereby for the purpose of applying pressure at various points about the circumference of the cap-flange, a sliding sleeve split longitudinally to form a plurality of yielding portions adapted to engage and effect the movement of the pressure-applying members, and means for effecting the movement of the sleeve.

6. In a bottle-capping machine, a capping head comprising a vertically-disposed casing, a cap-receiving opening at the lower end thereof, the annular wall of which is spaced from the wall of the casing and formed about its circumference with a plurality of openings, a plurality of pressure-applying members adapted to be projected through said openings, a sliding sleeve having its lower end disposed in the space between the casing and said separated wall and arranged to project said pressure-applying members through the openings, means for effecting the movement of said sliding sleeve, and a yielding member projecting into said cap-receiving opening for the purpose of engaging the top of the cap and holding the same on the bottle during the capping operation.

7. In a bottle-capping machine, a capping-head comprising a vertically-disposed casing having a cap-receiving opening at its lower end provided with an annular wall spaced from the wall of the casing and formed with a plurality of openings about its circumference, pressure-applying members adapted to be projected through the openings in said annular wall, a sliding sleeve arranged in said casing formed with a plurality of yielding sections, the lower portions of which extend between said annular wall and the wall of the casing and formed with cam surfaces adapted to effect the movement of said pressure-applying members, a yielding member within said casing consisting of two parts yieldingly connected, one part of which extends into the cap-receiving opening for the purpose of engaging the top of the cap for holding the latter on the bottle, a spring in said casing against the tension of which the other part of said member may yield, and means for operating said sliding sleeve.

8. In a bottle-capping machine, a capping-head comprising means for reciprocating the same, a plurality of pressure-applying members carried by said head, an actuating member carried by the head for effecting the movement of said pressure applying members, causing the same to engage the flange of the cap at different points about its circumference, an intermediately pivoted lever engaging at one end, said actuating member, and a member fixed relatively to the reciprocating head adapted to be engaged by the opposite end of said lever for the purpose of actuating the same.

9. In a bottle-capping machine, a capping-mechanism, a driving mechanism, means for operatively connecting said driving mechanism with the capping mechanism, and means for automatically disconnecting said driving mechanism from the capping mechanism after the action of the latter.

10. In a bottle-capping machine, a capping mechanism, a driving wheel, a clutch mechanism for automatically connecting said driving wheel with the capping-mechanism, clutch-throwing means for actuating the clutch to connect said driving wheel with the capping-mechanism, and means for automatically operating said clutch to release the driving wheel after the capping-mechanism has been operated, said releasing mechanism being arranged to operate regardless of the action of the clutch-throwing mechanism.

11. In a bottle-capping machine, a capping mechanism, an operating shaft, an operative connection between said shaft and the capping-mechanism, a driving wheel loose on said shaft, a sliding clutch for locking said driving wheel to the shaft, a spring tending to hold said clutch normally in position, locking the driving wheel to the shaft, a cam carried by said clutch, a member adapted to be moved in the path of the cam for effecting the movement of the clutch to release the driving wheel from the shaft, means for removing said member from the path of said cam, and means for automatically returning said member to the path of the cam after the capping mechanism has been operated.

12. In a bottle-capping machine, a capping-mechanism, a driving shaft, an operative connection between said shaft and the capping-mechanism, a driving wheel loose on said shaft provided with a clutch member, a sliding clutch carried by said shaft coacting with said clutch-member of the driving-wheel, a spring for normally holding said clutch-members in engagement, a cam carried by the sliding clutch, a sliding spring-pressed member normally disposed in the path of said cam and coacting therewith to disengage said clutch-members, a pivoted lever adapted to move said sliding member out of the path of the cam, means for operating said lever, and means for automatically releasing the sliding member to permit it to return to its normal position after the capping-mechanism has been operated.

13. In a bottle-capping machine, a capping-mechanism, a driving-shaft operatively connected with said capping-mechanism, a driving wheel loose on said shaft and provided with a clutch member, a sliding clutch on said shaft normally held in contact with the clutch member of the driving wheel, a cam carried by said sliding clutch, a yielding spring member normally projected in the path of said cam and coacting therewith to disengage the clutch members, an intermediately-pivoted lever for retracting the sliding member, a spring-pressed plunger carried by said lever, and an operating member for said lever adapted to engage the sliding plunger of the lever, the parts being so arranged that after the sliding member has been retracted from the path of the cam, the sliding plunger of said lever will move to disengage the lever operating member and thereby permit the sliding member to return to its normal position in the path of the cam.

14. In a bottle-capping machine, a compensating device comprising a yielding table for the bottle, a member rotatably mounted and carrying a ratchet, a spring-pressed pawl mounted independent of said member adapted to engage said ratchet, a second member rotatable on the first and operatively conected with said table, and a plurality of friction shoes carried by the first-mentioned member for engaging the second mentioned member.

15. In a bottle-capping machine, a compensating device comprising a member rotatably mounted and provided with a ratchet, a spring-pressed pawl engaging said ratchet, a plurality of spring-pressed shoes carried by said member, a second member arranged to rotate upon the first, and engaged by said shoes, means for varying the tension of the shoes, a yielding table to receive the bottle, and an operative connection between said table and the last-mentioned rotary member.

16. A bottle-capping machine comprising a base having a vertical column raised therefrom, a plunger arranged to reciprocate in said column, an arm carried by said plunger projecting from the column, a capping mechanism carried by said arm, a driving shaft, a pitman operatively connecting said plunger with said shaft, a driving wheel loose on said shaft provided with a clutch-member, a sliding clutch on said shaft normally held in engagement with said clutch member, a cam carried by said sliding clutch, a sliding spring-pressed member carried by the base normally projecting in the path of the cam for disengaging said clutch members, an intermediately pivoted lever for retracting said sliding member, a thrust lever for operating said intermediately pivoted lever, a spring-pressed sliding contact portion carried by said intermediately-pivoted lever adapted to be engaged by said thrust lever, and means for operating said thrust-lever.

17. A bottle-capping machine comprising a base, a capping head, a downwardly yieldable bottle-carrying support, means for frictionally retarding said downward movement, said means being ineffective during upward movement of the bottle-support.

In testimony whereof I affix my signature, in presence of two witnesses.

WILLIAM H. NIEMEYER.

Witnesses:
  AUGUSTUS W. BRADFORD,
  JNO. W. RUPP.